(12) United States Patent
Kang et al.

(10) Patent No.: US 11,618,687 B2
(45) Date of Patent: Apr. 4, 2023

(54) METHOD FOR PREPARING LITHIUM BIS(FLUOROSULFONYL)IMIDE SALT

(71) Applicant: LG Chem, Ltd., Seoul (KR)

(72) Inventors: Byung Soo Kang, Daejeon (KR); Hyun Jik Lee, Daejeon (KR); Won Jae Lee, Daejeon (KR); Chui Haeng Lee, Daejeon (KR); Young Min Lim, Daejeon (KR)

(73) Assignee: LG Energy Solution, Ltd.

(*) Notice: Subject to any disclaimer, the term of this patent is extended or adjusted under 35 U.S.C. 154(b) by 194 days.

(21) Appl. No.: 16/955,270

(22) PCT Filed: Apr. 9, 2019

(86) PCT No.: PCT/KR2019/004186
§ 371 (c)(1),
(2) Date: Jun. 18, 2020

(87) PCT Pub. No.: WO2019/199013
PCT Pub. Date: Oct. 17, 2019

(65) Prior Publication Data
US 2020/0392010 A1 Dec. 17, 2020

(30) Foreign Application Priority Data
Apr. 10, 2018 (KR) .................. 10-2018-0041723

(51) Int. Cl.
*C01D 15/00* (2006.01)
(52) U.S. Cl.
CPC .................. *C01D 15/00* (2013.01)
(58) Field of Classification Search
CPC .......................... C01D 15/00; C01D 21/086
See application file for complete search history.

(56) References Cited

U.S. PATENT DOCUMENTS

2004/0097757 A1    5/2004    Cernik et al.
2012/0041233 A1    2/2012    Sato et al.
(Continued)

FOREIGN PATENT DOCUMENTS

CN    102917979 A        2/2013
CN    106276829    *    1/2017
(Continued)

OTHER PUBLICATIONS

Definition of injecting (Year: 2022).*
(Continued)

*Primary Examiner* — Alexander Usyatinsky
(74) *Attorney, Agent, or Firm* — Lerner, David, Littenberg, Krumholz & Mentlik, LLP

(57) ABSTRACT

The present invention relates to a method for preparing a lithium bis(fluorosulfonyl)imide salt, including a step of dissolving bis(chlorosulfonyl)imide in an organic solvent in a non-glass vessel to prepare a first reaction solution; a step of injecting lithium fluoride (LiF) to the first reaction solution in the non-glass vessel and refluxing while heating to prepare a second reaction solution; a step of separating a product including a lithium bis(fluorosulfonyl)imide salt and the organic solvent from the second reaction solution; and a step of obtaining the lithium bis(fluorosulfonyl)imide salt in a solid phase from the product, wherein the organic solvent is at least one or more selected from the group consisting of ethyl acetate, butyl acetate, chloroform, dichloromethane, dichloroethane, benzene, xylene and acetonitrile.

10 Claims, 1 Drawing Sheet

(56) References Cited

U.S. PATENT DOCUMENTS

| | | | |
|---|---|---|---|
| 2013/0068991 A1 | 3/2013 | Sato et al. | |
| 2013/0331609 A1* | 12/2013 | Tsubokura | C07C 311/48 |
| | | | 564/82 |
| 2014/0075746 A1 | 3/2014 | Schmidt | |
| 2014/0243527 A1* | 8/2014 | Chue | C07D 295/182 |
| | | | 544/380 |
| 2015/0086466 A1 | 3/2015 | Sato et al. | |
| 2017/0133715 A1 | 5/2017 | Sato et al. | |
| 2018/0370799 A1 | 12/2018 | Lim | |
| 2019/0152792 A1* | 5/2019 | Yamada | H01M 10/0525 |
| 2019/0276311 A1 | 9/2019 | Itayama et al. | |

FOREIGN PATENT DOCUMENTS

| | | |
|---|---|---|
| CN | 106276829 A | 1/2017 |
| CN | 107226461 A | 10/2017 |
| EP | 2578533 A1 | 4/2013 |
| EP | 3466871 A1 | 4/2019 |
| JP | 2007182410 A | 7/2007 |
| JP | 2018035054 A | 3/2018 |
| KR | 20100134755 A | 12/2010 |
| KR | 20120022833 A | 3/2012 |
| KR | 20130028950 A | 3/2013 |
| KR | 20130114738 A | 10/2013 |
| KR | 20130140216 A | 12/2013 |
| KR | 101718292 B1 | 3/2017 |
| KR | 20170083368 A | 7/2017 |
| WO | WO 20110655 A * | 6/2011 |
| WO | 2017204303 A1 | 11/2017 |
| WO | WO 2017204225 * | 11/2017 |

OTHER PUBLICATIONS

The decision of JPO to grant a Patent (Year: 2021).*
The decision of KPO to grant a Patent (Year: 2021).*
International Search Report for PCT/KR2019/004186 dated Jul. 19, 2019; 3 pages.
Extended European Search Report including Written Opinion for Application No. 19785468.0 dated May 10, 2021, 9 pages.
Search Report dated Aug. 19, 2022 from Office Action for Chinese Application No. 201980006877 dated Aug. 26, 2022. 2 pgs.

* cited by examiner

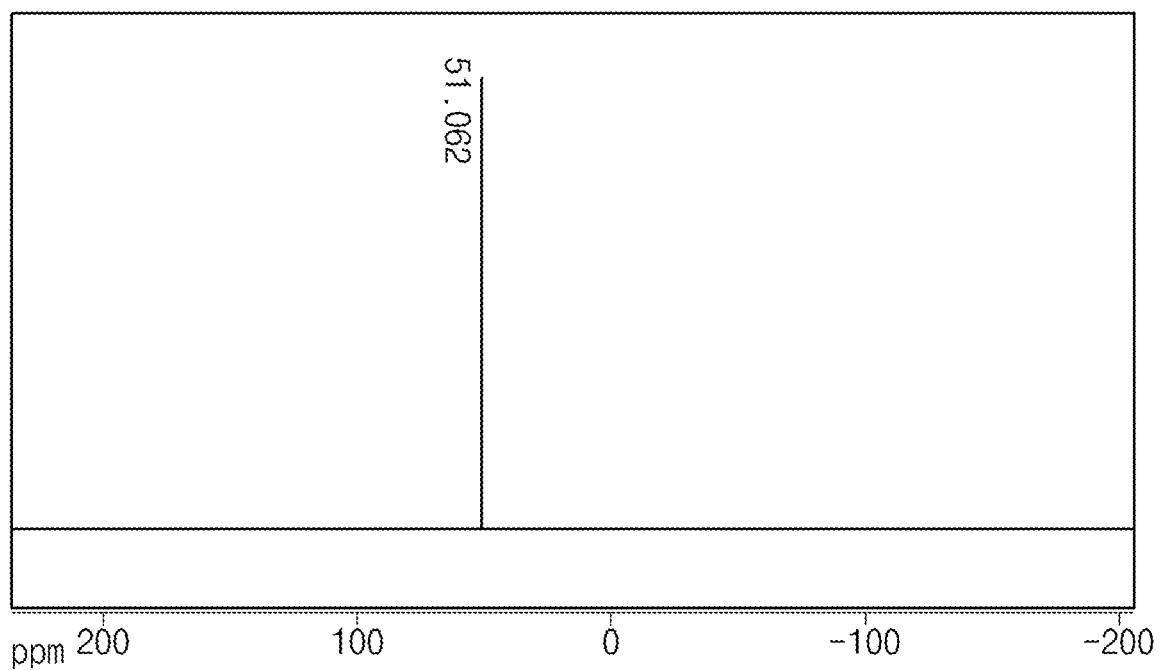

METHOD FOR PREPARING LITHIUM BIS(FLUOROSULFONYL)IMIDE SALT

CROSS-REFERENCE TO RELATED APPLICATIONS

The present application is a national phase entry under 35 U.S.C. § 371 of International Application No. PCT/KR2019/004186 filed Apr. 9, 2019, which claims priority from Korean Patent Application No. 10-2018-0041723 filed Apr. 10, 2018, all of which are incorporated herein by reference.

TECHNICAL FIELD

The present invention relates to a method for preparing a lithium bis(fluorosulfonyl)imide salt, and more particularly, to a method for preparing a lithium bis(fluorosulfonyl)imide salt, which is carried out in one-step reaction to improve processability, and in a vessel of a specific material suppressing side reactions to improve production efficiency.

BACKGROUND ART

Recently, as electric, electronic, communication and computer industries are rapidly developed, demand for secondary batteries having high performance and high stability has been significantly increased. Particularly, depending on trends of miniaturization and weight-lightening of electronic (communication) equipment, the thinning and miniaturizing of a lithium secondary battery which is a key component in these fields, are required.

As the electrolytes of lithium secondary batteries, ion conductive nonaqueous electrolytes obtained by dissolving electrolyte salts in nonaqueous organic solvents are primarily used.

Meanwhile, a lithium salt such as $LiPF_6$, which is widely used as the electrolyte salt is a material having low thermal stability and moisture sensitivity, and in case of reacting with water, HF is produced as a by-product due to the hydrolysis of $PF_6^-$. The HF thus produced spontaneously reacts with an electrode active material which shows weak basicity, to elute an electrode active material component. More particularly, if a positive electrode active material reacts with HF, a positive electrode active material component is eluted, of course, and lithium fluoride (LiF) is formed on the surface of the positive electrode to increase electrical resistance in an electrode and generate gas, thereby degrading battery life.

Recently, in order to solve such problems, study on an electrolyte salt which may replace $LiPF_6$ is on the rise, and a lithium imide salt has been suggested as a typical material.

Particularly, among the lithium imide salts, as a lithium bis(fluorosulfonyl)imide salt (LiFSI) becomes known to have high thermal stability and humidity safety, low corrosiveness and viscosity, and high electroconductivity, and is known as a material accomplishing excellent performance in high output conditions and at a low temperature, demand thereon is gradually increasing.

However, despite such advantages, the lithium bis(fluorosulfonyl)imide salt may be prepared via (1) fluoridating reaction of chlorosulfonyl imide or the salt thereof, (2) cation exchange reaction, and (3) contact reaction with an aqueous alkaline solution, in order. Accordingly, the preparation method is a multistep synthetic process and complicated, and thus, the commercialization thereof is difficult considering cost competition when compared with $LiPF_6$.

In addition, the yield of the lithium bis(fluorosulfonyl) imide salt is also lower when compared with the conventional lithium salts, and the development of a method for preparing a lithium bis(fluorosulfonyl)imide salt with high purity while decreasing the cost for the occupation of the market, is required.

(Patent Document) Korean Patent Laid-open Publication No. 2012-0022833

DISCLOSURE OF THE INVENTION

Technical Problem

An aspect of the present invention to solve the above-described problems is to provide a method for preparing a lithium bis(fluorosulfonyl)imide salt with high purity, by which reaction steps are simplified and side reactions are minimized.

Technical Solution

According to an aspect of the present invention, there is provided a method for preparing a lithium bis(fluorosulfonyl)imide salt, including a step of dissolving bis(chlorosulfonyl)imide in an organic solvent in a non-glass vessel to prepare a first reaction solution; a step of injecting lithium fluoride (LiF) to the first reaction solution in the non-glass vessel and refluxing while heating to prepare a second reaction solution; a step of separating a product including a lithium bis(fluorosulfonyl)imide salt and the organic solvent from the second reaction solution; and a step of obtaining the lithium bis(fluorosulfonyl)imide salt in a solid phase from the product, wherein the organic solvent is at least one or more selected from the group consisting of ethyl acetate, butyl acetate, chloroform, dichloromethane, dichloroethane, benzene, xylene and acetonitrile.

The non-glass vessel may be formed using at least one or more materials selected from the group consisting of polypropylene (PP), polytetrafluoroethylene (PTFE), high-density polyethylene (HDPE), a perfluoroalkoxy resin (PFA), polyvinylidene difluoride (PVDF), and fluoroethylene propylene (FEP).

The step of separating the product from the second reaction solution may include a step of cooling the second reaction solution; and a step of injecting an extractor to the cooled second reaction solution to separate the product including the lithium bis(fluorosulfonyl)imide salt and the organic solvent.

The step of obtaining the lithium bis(fluorosulfonyl)imide salt in a solid phase from the product may include a step of removing the organic solvent from the product for concentration; and a step of drying the concentrated product to obtain the lithium bis(fluorosulfonyl)imide salt in a solid phase.

In the step of preparing the first reaction solution, the organic solvent may be used in from 200 parts by weight to 1,000 parts by weight with respect to 100 parts by weight of the bis(chlorosulfonyl)imide.

Meanwhile, in the step of preparing the second reaction solution, the lithium fluoride (LiF) may be injected in 1 mol to 10 mol with respect to 1 mol of the bis(chlorosulfonyl) imide.

In addition, in the step of preparing the second reaction solution, a time period for the refluxing while heating may be from 2 hours to 20 hours.

The extractor may include at least one or more selected from the group consisting of LiOH (anhydride), $LiOH.H_2O$, Li$_2$CO$_3$, lithium methoxide (LiOMe), lithium ethoxide (LiOEt) and lithium tert-butoxide (LiOt-Bu).

Advantageous Effects

The method for preparing a lithium bis(fluorosulfonyl) imide salt according to the present invention may simplify a synthesis process to improve processability when compared with the conventional process, and may save production costs. In addition, since the synthesis reaction is performed in a non-glass vessel, side reactions generated during the reaction in a glass vessel during synthesis reaction may be prevented from happening, and a lithium bis(fluorosulfonyl) imide salt with high purity may be prepared.

BRIEF DESCRIPTION OF THE DRAWINGS

The FIGURE is a $^{19}$F-NMR spectrum of a lithium bis (fluorosulfonyl)imide salt prepared in Example 1 of the present invention.

BEST MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used herein are for the purpose of describing particular example embodiments only and are not intended to limit the present invention. The singular forms are intended to include the plural forms as well, unless the context clearly indicates otherwise.

It will be understood that the terms "comprise" and/or "comprising," when used in this specification, specify the presence of stated features, steps, elements or the combination thereof, but do not preclude the presence or addition of one or more other features, steps, elements or the combination thereof.

<Method for Preparing lithium bis(fluorosulfonyl)imide Salt>

The method for preparing a lithium bis(fluorosulfonyl) imide salt according to the present invention includes (1) a step of dissolving bis(chlorosulfonyl)imide in an organic solvent in a non-glass vessel to prepare a first reaction solution, (2) a step of injecting lithium fluoride (LiF) to the first reaction solution in the non-glass vessel and refluxing while heating to prepare a second reaction solution, (3) a step of separating a product including a lithium bis(fluorosulfonyl)imide salt and the organic solvent from the second reaction solution, and (4) a step of obtaining the lithium bis(fluorosulfonyl)imide salt in a solid phase from the product. Meanwhile, the organic solvent may be at least one or more selected from the group consisting of ethyl acetate, butyl acetate, chloroform, dichloromethane, dichloroethane, benzene, xylene and acetonitrile. Hereinafter, each step will be explained in detail.

(1) Preparation Step of First Reaction Solution

The step for preparing the first reaction solution is conducted by dissolving bis(chlorosulfonyl)imide in an organic solvent in a non-glass vessel.

In case of preparing a lithium bis(fluorosulfonyl)imide salt by the conventional method, fluoridation reaction of chlorosulfonyl imide or the salt thereof, cation exchange reaction and contact reaction with an aqueous alkaline solution are all required, and there are problems with its difficult preparation to a degree for commercialization in terms of cost competition.

Accordingly, recently, there have been attempts to prepare a lithium bis(fluorosulfonyl)imide salt by only fluoridation reaction using lithium fluoride (LiF) injected in step (2), which will be described later, but this method also has limitations relating to the difficult production of a lithium bis(fluorosulfonyl)imide salt in a solid phase.

Accordingly, in order to solve the problems, the present invention creates a method for preparing a lithium bis (fluorosulfonyl)imide salt in a solid phase with high purity, by which a first reaction solution is prepared in a non-glass vessel and lithium fluoride (LiF) is directly injected into the vessel, and thus, reaction steps are simplified, and side reactions of lithium fluoride (LiF) with silicon (Si) included in a vessel of a glass material is prevented from happening.

Particularly, for example, the non-glass vessel may be formed using at least one or more materials selected from the group consisting of polypropylene (PP), polytetrafluoroethylene (PTFE), high-density polyethylene (HDPE), a perfluoroalkoxy resin (PFA), polyvinylidene difluoride (PVDF), and fluoroethylene propylene (FEP).

The organic solvent which is the solvent of the first reaction solution may use any solvents which is capable of dissolving bis(chlorosulfonyl)imide without inducing side reactions with the bis(chlorosulfonyl)imide, typically, at least one or more selected from the group consisting of ethyl acetate, butyl acetate, chloroform, dichloromethane, dichloroethane, benzene, xylene and acetonitrile may be used.

However, as the organic solvent, an organic solvent such as tetrahydrofuran (THF) and toluene is not used, because these solvents may participate in the reaction and induce side reactions, and may inhibit the substitution reaction of the bis(chlorosulfonyl)imide and hinder the production of a lithium bis(fluorosulfonyl)imide salt.

The organic solvent may be included in 200 parts by weight to 1,000 parts by weight, preferably, 300 parts by weight to 700 parts by weight, more preferably, 300 parts by weight to 500 parts by weight with respect to 100 parts by weight of the bis(chlorosulfonyl)imide. A case of including the organic solvent in the range, is advantageous considering the reaction rate and cost.

In this case, the time period of the step for preparing the first reaction solution is set to a time period for sufficiently dissolving the bis(chlorosulfonyl)imide in the organic solvent without precipitation, and the first reaction solution may be prepared within 10 hours or less, more particularly, from 10 minutes to 2 hours.

(2) Preparation Step of Second Reaction Solution

Next, the step for preparing the second reaction solution will be explained. The second reaction solution is prepared by injecting lithium fluoride (LiF) in a non-glass vessel in which the first reaction solution has been prepared, and refluxing while heating.

More particularly, referring to Reaction 1,

[Reaction 1]

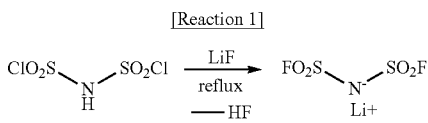

the reactants, bis(chlorosulfonyl)imide $(SO_2Cl)_2NH$) and lithium fluoride (LiF), react to produce a lithium bis(fluorosulfonyl)imide salt $((SO_2F)_2N^-Li^+)$.

More particularly, since the reaction undergoes a refluxing while heating process, though a separate catalyst is not used, a chlorine atom (Cl) of the bis(chlorosulfonyl)imide may be substituted with a fluorine atom (F) of lithium fluoride (LiF) by heat. In addition, the lone pair of a nitrogen atom (N) contained in the bis(chlorosulfonyl)imide reacts with a lithium atom (Li) of lithium fluoride (LiF) to produce a lithium bis(fluorosulfonyl)imide salt. In this case, the hydrogen of the bis(chlorosulfonyl)imide and the fluorine of the lithium fluoride (LiF) may partially react to produce hydrogen fluoride (HF). Through the reaction, the second reaction solution is prepared.

Meanwhile, during preparing the second reaction solution, the lithium fluoride (LiF) may be included in 1 mol to 10 mol, preferably, 1.8 mol to 10 mol, more preferably, 1.9 mol to 10 mol with respect to 1 mol of the bis(chlorosulfonyl)imide. If an excessive amount of the lithium fluoride (LiF) remains after finishing the reaction, side reactions may be induced and the lithium fluoride (LiF) is required to be removed after finishing the reaction. However, the removal of remaining lithium fluoride is a difficult process and costs high.

Accordingly, the lithium fluoride (LiF) is preferably in the range to perform sufficient reaction of the bis(chlorosulfonyl)imide, and to minimize the amount of remaining lithium fluoride (LiF) after finishing the reaction, thereby preventing side reactions from happening and increasing processability and reaction efficiency.

In the reaction process, the refluxing heating process may be performed while keeping the temperature to the boiling point of the organic solvent used or higher for from 2 hours to 20 hours, particularly, from 5 hours to 20 hours, more particularly, from 5 hours to 15 hours.

The temperature conditions of the refluxing heating process may be changed according to the kind of the organic solvent used, and if the refluxing heating process is carried out in the time period range, the reaction may be sufficiently carried out, and the production of by-products due to side reactions may be prevented.

(3) Separation Step of Product Including lithium bis(fluorosulfonyl)imide Salt

Next, a product including the lithium bis(fluorosulfonyl)imide salt and the organic solvent is separated from the second reaction solution. The step of separating the product from the second reaction solution includes 1) a step of cooling the second reaction solution and 2) a step of injecting an extractor to the cooled second reaction solution to separate the product including the lithium bis(fluorosulfonyl)imide salt and the organic solvent.

First, 1) the cooling step is a step for cooling the second reaction solution after finishing the reaction to room temperature or less, so that additional side reactions may not arise due to remaining heat after finishing the refluxing heating process, which is performed for the preparation of the second reaction solution. In this case, the room temperature means the annual mean temperature or the atmospheric temperature, particularly, the temperature in a range of 20±5° C.

Next, 2) the separating step of the product is a step of injecting an extractor to the cooled second reaction solution, and is a step of neutralizing the second reaction solution which is in a strongly acidic state as well as removing hydrogen fluoride (HF) produced as by-products during carrying out the reaction, and of separating the product including the lithium bis(fluorosulfonyl)imide salt and the organic solvent.

As the extractor, a lithium-containing basic compound may be used, and typical examples may include at least one or more selected from the group consisting of LiOH (anhydride), $LiOH \cdot H_2O$, $Li_2CO_3$, lithium methoxide (LiOMe), lithium ethoxide (LiOEt) and lithium tert-butoxide (LiOtBu). In this case, if the lithium-containing basic compound is an insoluble solid in an organic solvent, such as (saturated) LiOH and (saturated) $Li_2CO_3$, the insoluble solid may be dissolved in water and injected in an aqueous solution state.

The extractor may be included in 1 mol to 10 mol, preferably, 2 mol to 7 mol, more preferably, 3 mol to 6 mol with respect to 1 mol of the bis(chlorosulfonyl)imide. If the extractor in included in the range, a strongly acidic reaction solution may be neutralized, and impurities may be removed to produce a product with high purity.

By injecting the extractor, the hydrogen fluoride (HF) may be neutralized and separated from the product including the lithium bis(fluorosulfonyl)imide salt and the organic solvent, and may be easily removed in a subsequent extracting step of the organic solvent. After injecting the extractor, if the reaction solution is stirred at a temperature of room temperature or less, particularly, under temperature conditions of −10° C. to 10° C. for 30 minutes to 3 hours, the lithium bis(fluorosulfonyl)imide salt may be extracted by an organic solvent.

In case of using a compound capable of being dissolved in an organic solvent as the extractor, the compound produced as by-products reacts with hydrogen fluoride (HF) to produce an insoluble salt, and an organic layer may be separated through filtering.

If an extractor in an aqueous solution state is used as the extractor, the second reaction solution into which the extractor is injected, is injected into a separating funnel, an organic solvent layer including the product and an aqueous layer in which hydrogen fluoride (HF) and the extractor are dissolved, are separated, and the separated organic solvent layer may be recovered.

(4) Obtaining Step of lithium bis(fluorosulfonyl)imide Salt in Solid Phase

Finally, the step of obtaining the lithium bis(fluorosulfonyl)imide salt in a solid phase from the product will be explained. In order to obtain the lithium bis(fluorosulfonyl)imide salt in a solid phase, 1) a step of removing the organic solvent from the product for concentration, and 2) a step of drying the concentrated product to obtain a lithium bis(fluorosulfonyl)imide salt in a solid phase are included.

Step 1) and step 2), both are steps for improving the yield of the lithium bis(fluorosulfonyl)imide salt in a solid phase, and first, step 1) is a step for removing the organic solvent from the product. In order to remove the organic solvent, a method of concentrating at a low temperature in a reduced pressure, or a method of distilling by heating in an atmospheric pressure may be applied. However, the method is not limited to the illustrated methods, and any methods for improving the yield of the lithium bis(fluorosulfonyl)imide salt in a solid phase may be used as long as side reactions with the product are not induced and the organic solvent may be removed.

Meanwhile, the step of drying the product concentrated after step 1) is a step of drying the product in vacuum or in an environment blocked from the air. Drying processes generally used may be applied, and for example, a method of drying by applying heat in vacuum or a method of drying in a sealed desiccator may be used. Through the drying step, the lithium bis(fluorosulfonyl)imide salt in a solid phase may be obtained.

According to the above-described preparation method of the present invention, high yield may be achieved when compared with the conventional method. Particularly, the yield of the lithium bis(fluorosulfonyl)imide salt was only 16% or less by the conventional preparation method of the lithium bis(fluorosulfonyl)imide salt, but by using the method of the present invention, the lithium bis(fluorosulfonyl)imide salt in a solid phase may be obtained in a yield of at least 21% or higher.

MODE FOR CARRYING OUT THE INVENTION

Hereinafter, embodiments of the present invention will be described in detail for particularly explaining the present invention. However, the embodiments according to the present invention may be changed into various other types, but should not be interpreted to limit the scope of the present invention to the embodiments. The embodiments of the present invention are provided only for more complete explanation of the present invention to a person having an average knowledge in the art.

EXAMPLES

1. Example 1: Preparation of Lithium bis(fluorosulfonyl)imide Salt

To a vessel (manufacturer: BD Science, product name: Falcon) of a polypropylene (PP) material, equipped with a magnetic stirring bar, a reflux condenser and a thermometer, ethyl acetate (20 mL, 18.0 g) was injected as an organic solvent, and then, bis(chlorosulfonyl)imide (5.00 g, 23.4 mmol) was injected thereto and dissolved to prepare a first reaction solution.

Then, lithium fluoride (1.21 g, 46.8 mmol) was injected while stirring the first reaction solution at room temperature, and in a sealed state, refluxing while heating was carried out for 6 hours to prepare a second reaction solution. After finishing the reaction, the second reaction solution was cooled to room temperature (25° C.), and a saturated LiOH.H$_2$O aqueous solution (about 25 w/v %, 20 mL, 119 mmol) was added thereto dropwisely as an extractor while stirring, and the resultant solution was stirred for 30 minutes at a temperature or room temperature or less (−10° C. to 15° C.)

Next, the second reaction solution containing the extractor was poured to a separating funnel to separate an organic solvent layer containing the product and an aqueous layer containing hydrogen fluoride (HF). The organic solvent layer thus separated was recovered. The organic solvent layer thus recovered was concentrated in reduced pressure conditions until obtaining a semi-solid state. Then, an organic solvent layer residue in the semi-solid state was dried further in vacuum at room temperature for 1 hour or more to obtain a lithium bis(fluorosulfonyl)imide salt (yield 25%) in a white crystal phase. The lithium bis(fluorosulfonyl)imide salt thus obtained was identified by $^{19}$F-NMR ($^{19}$F-NMR (470 MHz, CD$_3$CN): δ 51.062 (s)) (see FIGURE), and as a result, the purity was 99% or more and impurities were not found.

2. Example 2: Preparation of Lithium bis(fluorosulfonyl)imide Salt

A lithium bis(fluorosulfonyl)imide salt (yield 21%) in a white crystal phase was obtained by the same method described in Example 1 except for using acetonitrile (20 mL, 15.7 g) as the organic solvent during preparing the first reaction solution. The lithium bis(fluorosulfonyl)imide salt thus obtained was identified by $^{19}$F-NMR, and the same spectrum as in Example 1 was obtained.

3. Example 3: Preparation of Lithium bis(fluorosulfonyl)imide Salt

A lithium bis(fluorosulfonyl)imide salt (yield 26%) in a white crystal phase was obtained by the same method described in Example 1 except for adding dropwisely a saturated Li$_2$CO$_3$ suspension (about 14.7 w/v %, 50 mL, 117 mmol) instead of the saturated LiOH.H$_2$O aqueous solution, as the extractor to the second reaction solution. The lithium bis(fluorosulfonyl)imide salt thus obtained was identified by $^{19}$F-NMR, and the same spectrum as in Example 1 was obtained.

4. Example 4: Preparation of Lithium bis(fluorosulfonyl)imide Salt

A lithium bis(fluorosulfonyl)imide salt (yield 25%) in a white crystal phase was obtained by the same method described in Example 1 except for using LiOH (anhydrous) instead of the saturated LiOH.H$_2$O aqueous solution, as the extractor for the second reaction solution. The lithium bis(fluorosulfonyl)imide salt thus obtained was identified by $^{19}$F-NMR, and the same spectrum as in Example 1 was obtained.

5. Example 5: Preparation of Lithium bis(fluorosulfonyl)imide Salt

A lithium bis(fluorosulfonyl)imide salt (yield 24%) in a white crystal phase was obtained by the same method described in Example 1 except for using a vessel of a high-density polyethylene material (manufacturer: Thermo Scientific, product name: Nalgene) instead of the vessel of a polypropylene (PP) material (Manufacturer: BD Science, product name: Falcon). The lithium bis(fluorosulfonyl)imide salt thus obtained was identified by $^{19}$F-NMR, and the same spectrum as in Example 1 was obtained.

6. Example 6: Preparation of Lithium bis(fluorosulfonyl)imide Salt

A lithium bis(fluorosulfonyl)imide salt (yield 25%) in a solid state was obtained by the same method described in Example 1 except for injecting lithium fluoride (2.73 g, 117 mmol). The lithium bis(fluorosulfonyl)imide salt thus obtained was identified by $^{19}$F-NMR, and the same spectrum as in Example 1 was obtained.

7. Example 7: Preparation of Lithium bis(fluorosulfonyl)imide Salt

A lithium bis(fluorosulfonyl)imide salt (yield 25%) in a solid state was obtained by the same method described in Example 1 except for injecting lithium fluoride (4.25 g, 164 mmol). The lithium bis(fluorosulfonyl)imide salt thus obtained was identified by $^{19}$F-NMR, and the same spectrum as in Example 1 was obtained.

8. Example 8: Preparation of Lithium bis(fluorosulfonyl)imide Salt

A lithium bis(fluorosulfonyl)imide salt (yield 14%) in a solid state was obtained by the same method described in Example 1 except for injecting lithium fluoride (0.91 g, 35.1 mmol). The lithium bis(fluorosulfonyl)imide salt thus obtained was identified by 19F-NMR, and the same spectrum as in Example 1 was obtained.

9. Example 9: Preparation of Lithium bis(fluorosulfonyl)imide Salt

A lithium bis(fluorosulfonyl)imide salt (yield 25%) in a solid state was obtained by the same method described in Example 1 except for refluxing while heating for 10 hours during preparing the second reaction solution. The lithium bis(fluorosulfonyl)imide salt thus obtained was identified by 19F-NMR, and the same spectrum as in Example 1 was obtained.

10. Example 10: Preparation of Lithium bis(fluorosulfonyl)imide Salt

A lithium bis(fluorosulfonyl)imide salt (yield 22%) in a solid state was obtained by the same method described in Example 1 except for refluxing while heating for 3 hours during preparing the second reaction solution. The lithium bis(fluorosulfonyl)imide salt thus obtained was identified by $^{19}$F-NMR, and the same spectrum as in Example 1 was obtained.

11. Example 11: Preparation of Lithium bis(fluorosulfonyl)imide Salt

A lithium bis(fluorosulfonyl)imide salt (yield 23%) in a solid state was obtained by the same method described in Example 1 except for refluxing while heating for 18 hours during preparing the second reaction solution. The lithium bis(fluorosulfonyl)imide salt thus obtained was identified by $^{19}$F-NMR, and the same spectrum as in Example 1 was obtained.

COMPARATIVE EXAMPLES

1. Comparative Example 1: Preparation of Lithium bis(fluorosulfonyl)imide Salt A lithium bis(fluorosulfonyl)imide salt (yield 16%) in a white crystal phase was obtained by the same method described in Example 1 except for using a round bottom glass flask vessel (manufacturer: Scott-duran) instead of the equipped vessel of a polypropylene (PP) material (manufacturer: BD Science, product name: Falcon), and performing a dehydration process using toluene.

2. Comparative Example 2: Preparation of Lithium bis(fluorosulfonyl)imide Salt The same method described in Example 1 was performed except for injecting tetrahydrofuran (20 mL, 17.8 g) as the organic solvent for preparing the first reaction solution. However, a lithium bis(fluorosulfonyl)imide salt in a white crystal phase was not obtained.

3. Comparative Example 3: Preparation of Lithium bis(fluorosulfonyl)imide Salt The same method described in Example 2 was performed except for injecting toluene (20 mL, 17.3 g) as the organic solvent for preparing the first reaction solution. However, a lithium bis(fluorosulfonyl)imide salt in a white crystal phase was not obtained.

The foregoing is illustrative of embodiments for conducting the method for preparing a lithium bis(fluorosulfonyl) imide salt according to the present invention. The present invention is not limited to the embodiments, and various modifications are intended to be included in the technical spirit of the present invention within the scope of the present inventive concept to those skilled in the art without deviating from the gist of the present invention as defined in the claims herein.

The invention claimed is:

1. A method for preparing a lithium bis(fluorosulfonyl) imide salt, the method comprising:
   a step of dissolving bis(chlorosulfonyl)imide in an organic solvent in a non-glass vessel to prepare a first reaction solution;
   a step of adding lithium fluoride (LiF) to the first reaction solution in the non-glass vessel, and refluxing for from 2 hours to 20 hours to prepare a second reaction solution;
   a step of separating a product including a lithium bis (fluorosulfonyl)imide salt and the organic solvent from the second reaction solution; and
   a step of obtaining the lithium bis(fluorosulfonyl)imide salt in a solid phase with a purity of 99% or more from the product,
   wherein the organic solvent is at least one or more selected from the group consisting of ethyl acetate, butyl acetate, chloroform, dichloromethane, dichloroethane, benzene, xylene and acetonitrile, and
   wherein in the step of preparing the second reaction solution, the reactants of the following Reaction 1, bis(chlorosulfonyl)imide (SO$_2$Cl)$_2$NH) and lithium fluoride (LiF) react to produce a lithium bis(fluorosulfonyl)imide salt ((SO$_2$F)$_2$N$^-$Li$^+$):

[Reaction 1]

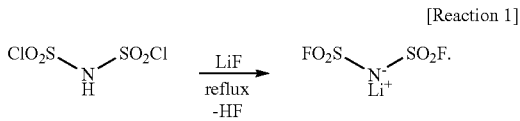

2. The method for preparing the lithium bis(fluorosulfonyl)imide salt according to claim 1, wherein the non-glass vessel is formed using at least one or more materials selected from the group consisting of polypropylene (PP), polytetrafluoroethylene (PTFE), high-density polyethylene (HDPE), a perfluoroalkoxy resin (PFA), polyvinylidene difluoride (PVDF), and or fluoroethylene propylene (FEP).

3. The method for preparing the lithium bis(fluorosulfonyl)imide salt according to claim 1, wherein the step of separating the product from the second reaction solution comprises: a step of cooling the second reaction solution; and a step of adding an extractor to the cooled second reaction solution to separate the product comprising the lithium bis(fluorosulfonyl)imide salt and the organic solvent.

4. The method for preparing the lithium bis(fluorosulfonyl)imide salt according to claim 1, wherein the step of obtaining the lithium bis(fluorosulfonyl)imide salt in the solid phase with the purity of 99% or more from the product comprises: a step of removing the organic solvent from the product for concentration; and a step of drying the concentrated product to obtain the lithium bis(fluorosulfonyl)imide salt in a solid phase.

5. The method for preparing the lithium bis(fluorosulfonyl)imide salt according to claim 1, wherein in the step of preparing the first reaction solution, the organic solvent is used in from 200 parts by weight to 1,000 parts by weight with respect to 100 parts by weight of the bis(chlorosulfonyl)imide.

6. The method for preparing the lithium bis(fluorosulfonyl)imide salt according to claim 1, wherein in the step of preparing the second reaction solution, the lithium fluoride (LiF) is injected in 1 mol to 10 mol with respect to 1 mol of the bis(chlorosulfonyl)imide.

7. The method for preparing the lithium bis(fluorosulfonyl)imide salt according to claim 3, wherein the extractor comprises at least one or more selected from LiOH (anhydride), $LiOH.H_2O$, $Li_2CO_3$, lithium methoxide (LiOMe), lithium ethoxide (LiOEt) lithium or tert-butoxide (LiOt-Bu).

8. The method for preparing the lithium bis(fluorosulfonyl)imide salt according to claim 1, wherein in the step of preparing the first reaction solution, a time period for dissolving bis(chlorosulfonyl)imide in the organic solvent is within 10 hours or less.

9. The method for preparing the lithium bis(fluorosulfonyl)imide salt according to claim 3, wherein the step of cooling the second reaction solution is at room temperature or less.

10. The method for preparing the lithium bis(fluorosulfonyl)imide salt according to claim 3, wherein the extractor is included in 1 mol to 10 mol with respect to 1 mol of the bis(fluorosulfonyl)imide.

\* \* \* \* \*

UNITED STATES PATENT AND TRADEMARK OFFICE
CERTIFICATE OF CORRECTION

| | | |
|---|---|---|
| PATENT NO. | : 11,618,687 B2 | Page 1 of 1 |
| APPLICATION NO. | : 16/955270 | |
| DATED | : April 4, 2023 | |
| INVENTOR(S) | : Byung Soo Kang et al. | |

It is certified that error appears in the above-identified patent and that said Letters Patent is hereby corrected as shown below:

On the Title Page

Item [72] Chui Haeng Lee should read -- Chul Haeng Lee --

Signed and Sealed this
Second Day of May, 2023

Katherine Kelly Vidal
*Director of the United States Patent and Trademark Office*